US007970629B2

(12) United States Patent
Christen (10) Patent No.: US 7,970,629 B2
(45) Date of Patent: Jun. 28, 2011

(54) ADAPTIVE SYSTEM FOR FINANCIAL CLAIM REIMBURSEMENT PROCESSING

(75) Inventor: James D. Christen, Downingtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 801 days.

(21) Appl. No.: 11/875,141

(22) Filed: Oct. 19, 2007

(65) Prior Publication Data

US 2008/0109256 A1 May 8, 2008

Related U.S. Application Data

(60) Provisional application No. 60/864,024, filed on Nov. 2, 2006.

(51) Int. Cl.
*G06Q 50/00* (2006.01)
*G06Q 10/00* (2006.01)

(52) U.S. Cl. ................................. 705/2; 705/4
(58) Field of Classification Search .................. 705/2–4
See application file for complete search history.

(56) References Cited

U.S. PATENT DOCUMENTS

| | | | | |
|---|---|---|---|---|
| 4,491,725 | A * | 1/1985 | Pritchard | ........................... 705/2 |
| 5,704,044 | A | 12/1997 | Tarter et al. | |
| 5,933,809 | A | 8/1999 | Hunt et al. | |
| 6,208,973 | B1 | 3/2001 | Boyer et al. | |
| 6,343,271 | B1 | 1/2002 | Peterson et al. | |
| 7,006,893 | B2 | 2/2006 | Hart et al. | |
| 7,072,842 | B2 | 7/2006 | Provost et al. | |
| 2003/0149594 | A1 | 8/2003 | Beazley et al. | |
| 2003/0191665 | A1* | 10/2003 | Fitzgerald et al. | ................ 705/2 |
| 2003/0191667 | A1 | 10/2003 | Fitzgerald et al. | |
| 2003/0191669 | A1 | 10/2003 | Fitzgerald et al. | |
| 2003/0208379 | A1 | 11/2003 | Haskey et al. | |
| 2003/0216831 | A1 | 11/2003 | Hart et al. | |
| 2003/0229516 | A1 | 12/2003 | Nickerson | |
| 2004/0153336 | A1 | 8/2004 | Virdee et al. | |
| 2005/0033609 | A1 | 2/2005 | Yang | |
| 2005/0137912 | A1 | 6/2005 | Rao et al. | |
| 2005/0216315 | A1 | 9/2005 | Andersson | |
| 2006/0041487 | A1 | 2/2006 | Santalo et al. | |
| 2008/0027759 | A1* | 1/2008 | Flam et al. | ........................ 705/4 |

OTHER PUBLICATIONS

Yang, Selecting Structural Patterns for Classification, Proceedings of the 38th Hawaii International Conference on System Sciences—2005.*

* cited by examiner

*Primary Examiner* — Robert Morgan
*Assistant Examiner* — Tran Nguyen
(74) *Attorney, Agent, or Firm* — Alexander J Burke (57) ABSTRACT

A system improves payment claims transactions by analyzing payments transactions to update payment edit rules according to information derived from the transactions. A system adapts rules used for processing claim adjudication data provided by a payer organization concerning a claim for reimbursement for provision of healthcare to a patient previously submitted to the payer organization in a claim. The system includes a data processor for parsing claim adjudication data provided by a specific payer organization in an electronic transaction message to identify data comprising, (a) a payer organization identifier and (b) a reason for rejection of a claim. A rules processor automatically generates a payer specific rule for use in pre-processing a claim for submission to the specific payer identified by the payer organization identifier by translating data comprising the reason for rejection into a logical expression resolvable using data elements in a claim. A rules repository accumulates data representing automatically generated payer specific rules for pre-processing a claim for submission to the specific payer.

19 Claims, 8 Drawing Sheets

```
ISA*00*          *00*          *ZZ*000000000609     *ZZ*330185
GS*HP*000000000021*330185*20060504*0652*1*X*004010X091A1~
ST*835*0001~
BPR*I*97662.32*C*ACH*CCP*01*044000037*DA*0632619045*1237391136**01*021410080*DA*923197834*20060503~
TRN*1*EFT1093035*1237391136*00308~
REF*EV*231704148~
DTM*405*20060502~
N1*PR*EMPIRE BLUE CROSS~                N1 Segment
N3*622 THIRD AVE~                       Payer Name
N4*NEW YORK*NY*10017~
N1*PE*THE BEST MEMORIAL HOSPITAL*FI*111999988~
N3*NORTH BRYER ROAD~
N4*SOMEWHERE*NY*11732~
REF*PQ*330185~
LX*110412~
TS3*330185*11*20041231*2*0*126969.3***-126969.3*-117554.7****113689.3~
TS2*********5.6*2*35~
CLP*6424890909*22*-126969.3*0*HA*20060400066150I*118**416*-1.5918*-1~
CAS*CR2*-1971~
NM1*QC*1*FLINTSTONE*FREDERICK*E***EN*099999999A~
MIA*0***-9414.6*HA02***-817.6*-027.6***-10.3****-8887~
REF*EA*518961~
DTM*050*20060209~
DTM*232*20040301~
DTM*233*20040405~
QTY*CA*-35~
QTY*CD*-9~
SVC*NU:0120*-7350*0*0000*0~
DTM*472*20040405~
CAS*CR*29*-7350*-5~
SVC*NU:0210*-19800*0*0000*0~
DTM*472*20040405~
CAS*CR*29*-19800*-9~
SVC*NU:0214*-39600*0*0000*0~
DTM*472*20040405~
CAS*CR*29*-39600*-20~
SVC*NU:0214*-2200*0*0000*0~
DTM*472*20040405~
CAS*CR*29*-2200*-1~
```

303 — N1 Segment Payer Name

305 — CLP Segment: Claim payment contains reference to original claim submission 307 — CAS Segment: "CR" is the group code, "29" is the adjustment reason code

FIGURE 4

ASC X12N - INSURANCE SUBCOMMITTEE　　　　　　　　　　　　004010X091 - 835 - 2100 - CAS
IMPLEMENTATION GUIDE　　　　　　　　　　　　　　　　　　　　　　　CLAIM ADJUSTMENT

ELEMENT SUMMARY

405

| | USAGE | REF. DES. | DATA ELEMENT | NAME | ATTRIBUTES |
|---|---|---|---|---|---|
| | REQUIRED | CAS01 | 1033 | Claim Adjustment Group Code | M ID 1/2 |

Code identifying the general category of payment adjustment

Evaluate the group codes in CAS01 based on the following order for their applicability to a set of one or more adjustments: PR, CO, PI, CR, OA. See 2.2.4, Claim Adjustment and Service Adjustment Segment Theory, for additional information. (Note: This does not mean that the adjustments must be reported in this order.)

| CODE | DEFINITION |
|---|---|
| CO | Contractual Obligations |
| | Use this code when a joint payer/payee contractual agreement or a regulatory requirement resulted in an adjustment. |
403
| CR | Correction and Reversals |
| | Use this code for corrections and reversals to PRIOR claims. Use when CLP02=22, Reversal of Previous Payment. |
| OA | Other adjustments |
| PI | Payor Initiated Reductions |
| | Use this code when, in the opinion of the payer, the adjustment is not the responsibility of the patient, but there is no supporting contract between the provider and the payer (i.e., medical review or professional review organization adjustments). |
407
| PR | Patient Responsibility |

| | REQUIRED | CAS02 | 1034 | Claim Adjustment Reason Code | M ID 1/5 |

Code identifying the detailed reason the adjustment was made

409
INDUSTRY: Adjustment Reason Code
CODE SOURCE 139: Claim Adjustment Reason Code

| | REQUIRED | CAS03 | 782 | Monetary Amount | M R 1/18 |

Monetary amount

INDUSTRY: Adjustment Amount

SEMANTIC: CAS03 is the amount of adjustment.

COMMENT: When the submitted charges are paid in full, the value for CAS03 should be zero.

Use this monetary amount for the adjustment amount. A negative amount increases the payment, and a positive amount decreases the payment contained in CLP04.

104 Managed care withholding.

105 Tax withholding.

106 Patient payment option/election not in effect.

107 Claim/service denied because the related or qualifying claim/service was not previously paid or identified on this claim.
Note: Changed as of 6/03

108 Payment adjusted because rent/purchase guidelines were not met.
Note: Changed as of 6/02

603

109 Claim not covered by this payer/contractor. You must send the claim to the correct payer/contractor.

110 Billing date precedes service date.

111 Not covered unless the provider accepts assignment.

112 Payment adjusted as not furnished directly to the patient and/or not documented.
Note: Changed as of 2/01

113 Payment denied because service/procedure was provided outside the United States or as a result of war.
Note: Changed as of 2/01

114 Procedure/product not approved by the Food and Drug Administration.

115 Payment adjusted as procedure postponed or canceled.
Note: Changed as of 2/01

116 Payment denied. The advance indemnification notice signed by the patient did not comply with requirements.
Note: Changed as of 2/01

117 Payment adjusted because transportation is only covered to the closest facility that can provide the necessary care.
Note: Changed as of 2/01

ADAPTIVE SYSTEM FOR FINANCIAL CLAIM REIMBURSEMENT PROCESSING

This is a non-provisional application of provisional application Ser. No. 60/864,024 filed Nov. 2, 2006, by J. D. Christen.

FIELD OF THE INVENTION

This invention concerns a system for adapting rules used for processing claim data related to reimbursement for provision of healthcare to a patient by specific payer organizations involving translating data representing claim rejections.

BACKGROUND OF THE INVENTION

Payer organizations (payers) employ claims rules used for determining whether, and how much, to pay on a claim for reimbursement of healthcare costs for a patient. The claims rules are specific to each payer organization and are tailored to specific healthcare providers (i.e. a hospital, a physician) according to contractual terms in agreements. These terms may vary between individual contracts which limit use of universal rules applicable to all contracts. In the absence of comprehensive knowledge of these rules, claims submitted to payers for payment are often rejected. Claim rejections typically begin a long cycle of correction and resubmission, costing the healthcare provider both time and money in trying to collect what is owed to them.

When a patient receives healthcare services (e.g., a diagnostic X-Ray) the provider of those services sends information to the patient payers (e.g., their insurers) requesting to be reimbursed. Payers require that the information sent to them be formatted in a specific way (this formatting can vary by individual payer). Payers may also require different payer specific information to be sent, depending on the services that have been rendered. If the information sent to the payer is incomplete, or is not formatted correctly, the payer rejects the claim via an EDI (Electronic Data Interchange) 835 transaction remittance advice (RA). The provider attempts to edit the claim to provide the correct data in the correct format, and resubmits the edited claim to the payers. In response to submission of correct claim data, the payer may reimburse the provider, and send back an electronic notice of this reimbursement, also in the form of an RA. If the reimbursement amount is less than the provider charged for the service, the provider may submit a secondary claim to a different payer for the un-reimbursed amount. Healthcare providers including, hospitals, facilities, clinicians, and billing services typically experience a high claim rejection rate since they often submit claims with financial data that does not comply with payer rules and regulations resulting in substantial delay in fee collection. Turnaround times for claim reimbursement of 30 to 45 days are common and costly for providers.

Known systems often send inaccurate claims to payer organizations, wait for them to be rejected and serially fix the claims rejections. Alternatively, known systems send claims to a third-party, called a "Claims Scrubbers" that has its own set of payer rules and has some limited edit capabilities to fix problems using manual intervention before sending the claims to a payer. However, much time is wasted in this serial and iterative method for submitting claims and receiving rejections and partial payments involving claim correction and resubmission and payer rules are difficult to obtain and maintain. A system according to invention principles addresses these deficiencies and related problems.

SUMMARY OF THE INVENTION

A system improves payment claims transactions by analyzing payment transactions to update payment edit rules according to information derived from the transactions. A system adapts rules used for processing claim adjudication data provided by a payer organization concerning a claim for reimbursement for provision of healthcare to a patient previously submitted to the payer organization in a claim. The system includes a data processor for parsing a claim related electronic transaction message from a particular payer organization to identify data comprising, (a) a payer organization identifier and (b) a reason for rejection of a claim. A rules processor automatically generates a payer specific rule for use in pre-processing a claim for submission to the specific payer identified by the payer organization identifier by translating data comprising the reason for rejection into a logical expression resolvable using data elements in a claim. A rules repository accumulates data representing automatically generated payer specific rules for preprocessing a claim for submission to the specific payer.

BRIEF DESCRIPTION OF THE DRAWING

FIG. 4 indicates Claim Adjustment segment (CAS) codes used in Remittance Advice analysis, according to invention principles.

DETAILED DESCRIPTION OF THE INVENTION

The inventors have advantageously recognized a need to obtain knowledge of payer rules for a healthcare provider to optimize cash flow by submission of properly formatted claims. Obtaining healthcare payer rules is a difficult and costly task for healthcare providers. Payer organizations are reluctant to disclose their internal contract requirements, even to those with whom they do business on a regular basis. Websites contain some information as well as billing manuals, companion guides issued by payers, and information is also available from other sources. The requirements from multiple different sources are analyzed and rules derived to accurately reflect payer requirements in order to ensure accurate claim submission for reimbursement. A system automatically generates claim data processing rules based on results of claim data adjudication by payer organizations used to determine a reimbursement sum. The system incorporates the generated claim data processing rules and as time goes by, rejections by payer organizations are systematically eliminated. The laborious process of obtaining payer rules by gleaning information from many sources is also eliminated.

The system advantageously automates the acquisition of payer rules and operates so that as a provider continues to submit claims to a varied range of payers, the set of rules maintained by healthcare providers for each payer organization, that mirrors the rules used by payer organizations to adjudicate claims, are being constantly updated and improved. This improvement is accomplished by automating the analysis of payer rejections and automating payer rule creation based on claim data submission error analysis. In using the system, the rate of claim rejections by payer organizations progressively decreases until a healthcare provider has automatically acquired rules necessary to submit error free claims for each payer organization.

Claim adjudication data is data provided by a particular payer organization such as in the form of a payment notification such as an EDI 835 Remittance Advice (RA) indicating disposition (e.g., acceptance, denial, rejection) of a claim for reimbursement for provision of healthcare to a patient. The system includes a data processor. A processor, as used herein, operates under the control of an executable application to (a) receive information from an input information device, (b) process the information by manipulating, analyzing, modifying, converting and/or transmitting the information, and/or (c) route the information to an output information device. A processor may use, or comprise the capabilities of, a controller or microprocessor, for example. The processor may operate with a display processor or generator. A display processor or generator is a known element for generating signals representing display images or portions thereof. A processor and a display processor may comprise a combination of, hardware, firmware, and/or software.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity. Workflow comprises a sequence of tasks performed by a device or worker or both. An object or data object comprises a grouping of data, executable instructions or a combination of both or an executable procedure.

A workflow processor, as used herein, processes data to determine tasks to add to a task list, remove from a task list or modifies tasks incorporated on, or for incorporation on, a task list. A task list is a list of tasks for performance by a worker or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition. The workflow engine includes a process definition function that allows users to define a process that is to be followed and includes an Event Monitor, which captures events occurring in a Healthcare Information System. A processor in the workflow engine tracks which processes are running, for which patients, and what step needs to be executed next, according to a process definition and includes a procedure for notifying clinicians of a task to be performed, through their worklists (task lists) and a procedure for allocating and assigning tasks to specific users or specific teams. A document or record comprises a compilation of data in electronic form and is the equivalent of a paper document and may comprise a single, self-contained unit of information.

Figure 1:
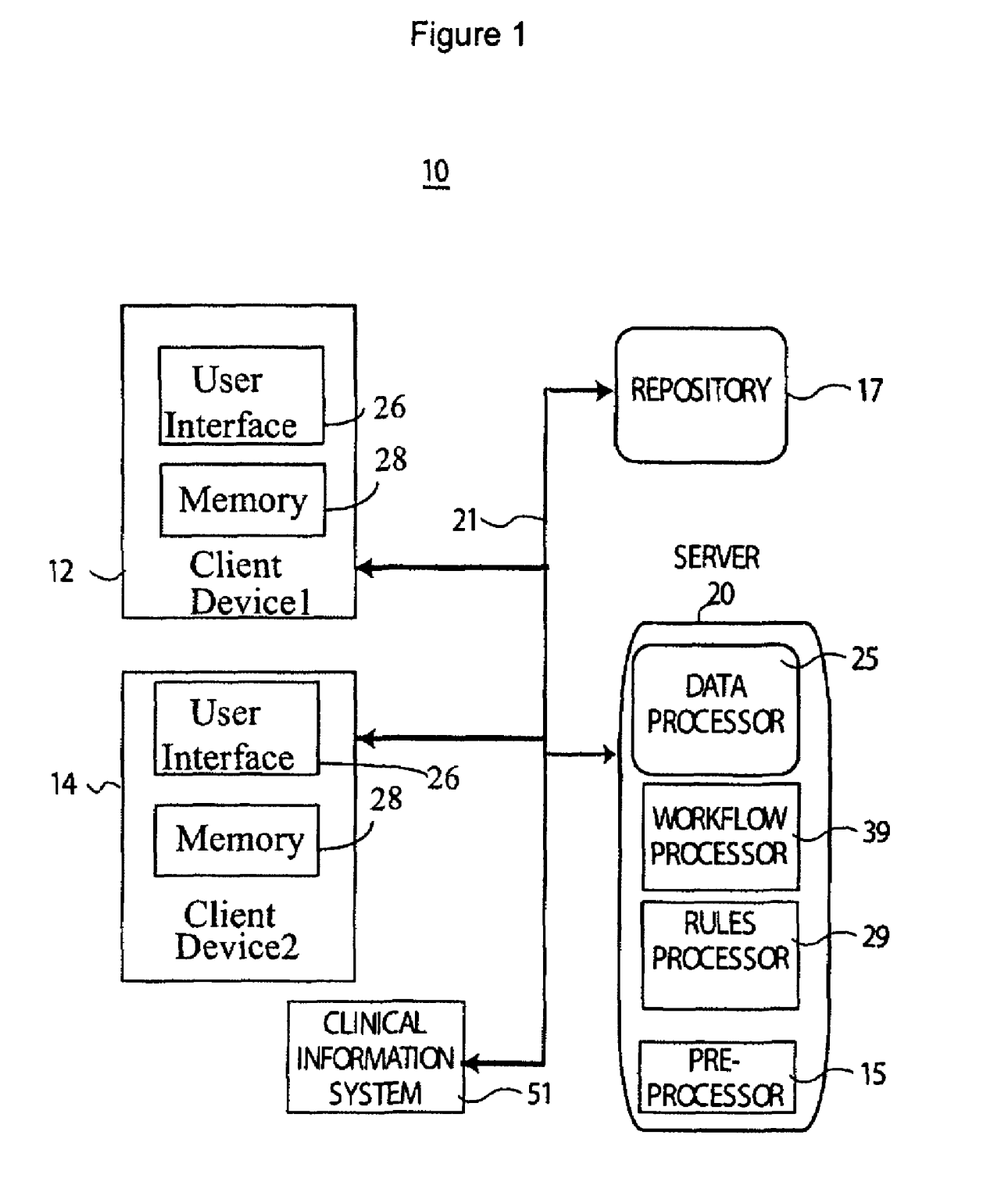
FIG. 1 shows a system for adapting rules used for processing claim data related to reimbursement for provision of healthcare to a patient by specific payer organizations, according to invention principles.

FIG. 1 shows a healthcare record processing system 10 for managing encounter record completion and including client devices (workstations) 12 and 14, repository 17, clinical information system 51 and server 20 bidirectionally communicating via network 21. Data processor 25 parses a claim related electronic transaction message from a particular payer organization to identify data comprising, (a) a payer organization identifier and (b) a reason for rejection of a claim. Rules processor 29 automatically generates a payer specific rule for use in pre-processing a claim for submission to the specific payer identified by the payer organization identifier by translating data comprising the reason for rejection into a logical expression resolvable using data elements in a claim. Rules repository 17 accumulates data representing automatically generated payer specific rules for pre-processing a claim for submission to the specific payer. Pre-processor 15 applies the automatically generated payer specific rules acquired from rules repository 17 to a claim prior to submission of the claim to the specific payer. In one embodiment, workflow processor 39 automatically adds a task to a worker task list to correct a claim in response to a claim deficiency being identified by applying an automatically generated payer specific rule.

Figure 2:
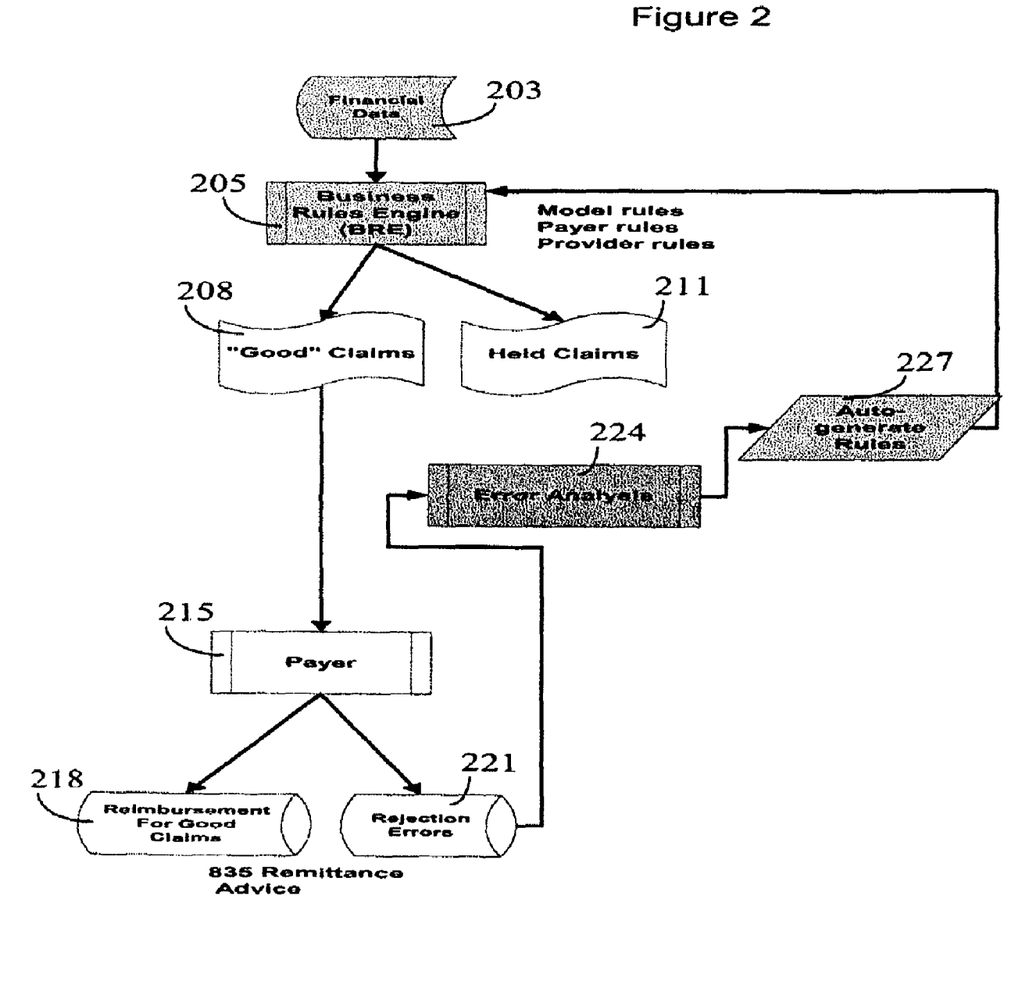
FIG. 2 shows a system for analyzing payer rejections of submitted claims and automatically generating payer specific rules, according to invention principles.
Figure 3:
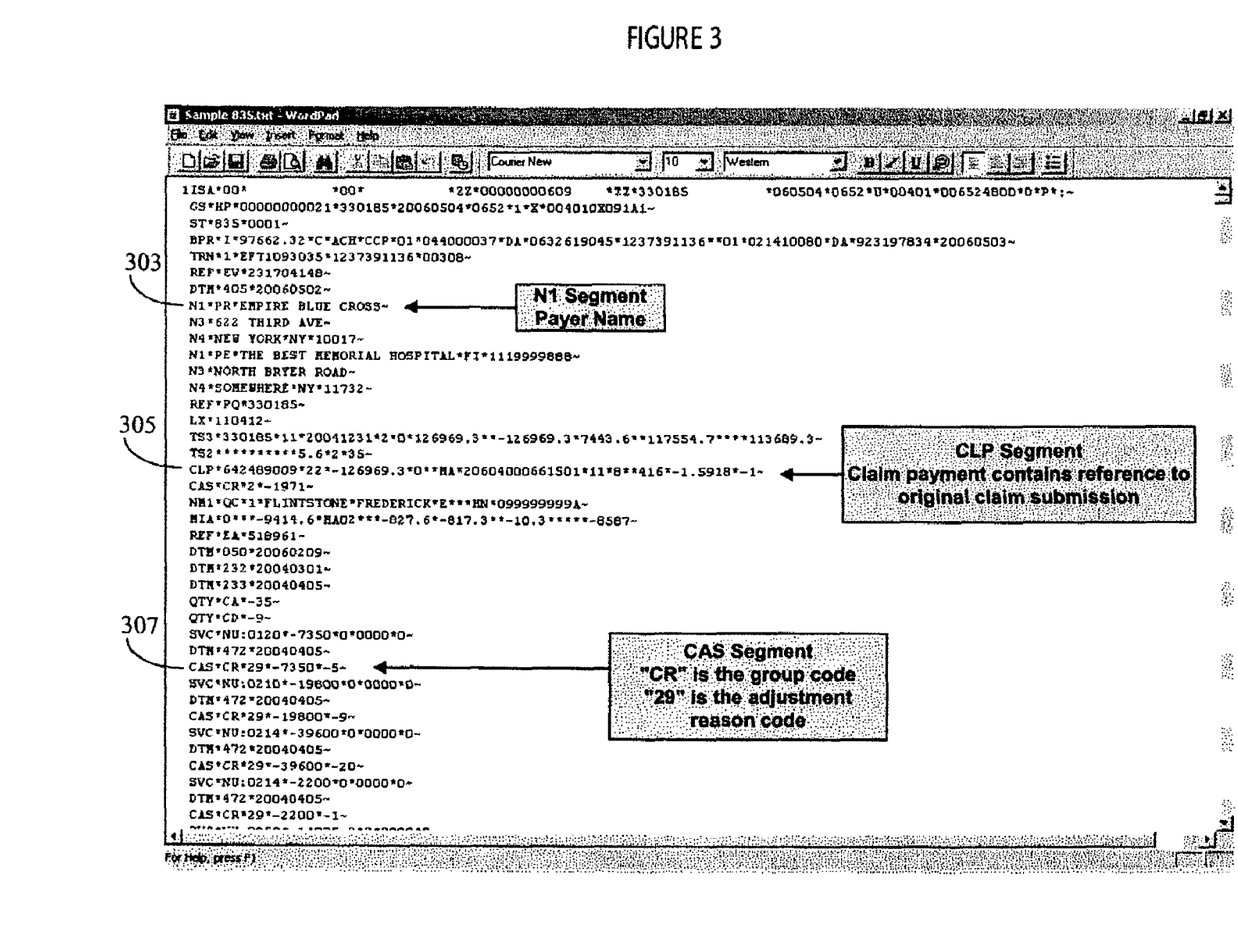
FIG. 3 shows an example of a Remittance Advice (835 transaction), according to invention principles.

FIG. 2 shows a system for analyzing payer rejections of submitted claims and for automatically generating payer specific rules. The system generates and adapts rules used for processing claim data. A Business Rules Engine (BRE) 205 processes financial data 203 (intermittently or nightly, for example) to produce claims for submission to specific payer organizations for reimbursement for provision of healthcare to a patient. The claims produced that meet the format and other requirements of a destination payer organization, as determined by rules of BRE 205 (i.e. good claims 208), are submitted to the payer organization 215 for adjudication to determine the sum to be reimbursed. Claims not meeting the BRE payer specific rules are held (i.e. claims 211) until a rule condition is met. A substantial proportion of submitted claims are typically rejected by payer organizations because the sets of payer specific rules stored and used by BRE 205 fail to adequately match the rules used by the payer organizations. Messages identifying claim rejections including claim preparation errors and any partial rejection (and partial payment) errors 221 are transmitted back to a healthcare provider in the form of an EDI 835 HIPAA compliant transaction Remittance Advice (RA) used to communicate payments and rejection data as illustrated in FIG. 3. Correct claims are reimbursed by payment to a healthcare provider 218.

Messages identifying claim rejections including claim preparation errors are analyzed 224 and used to automatically generate rules and adapt and modify 227 existing rules employed by BRE 205. Thereby, rules are continuously improved to ensure rules employed by BRE 205 more closely match the rules used by the payer organizations and claim rejections are progressively reduced. Claim rejections including claim preparation errors are analyzed 224 by analyzing payer rejection data contained in a RA (adjudication data), matching the RA to an original submitted claim, generating and formatting a rule or series of rules for a specific payer organization and a specific rejection and incorporating the generated rules into BRE 205. Rule generation is described in more detail in connection with FIG. 7. Error analysis 224 is advantageously facilitated by transmitting payer rejections in a uniform format that can be interpreted by a computer program.

FIG. 3 shows an example of a Remittance Advice (835 transaction). Claim rejections including claim preparation errors are analyzed 224 (FIG. 2) using a software program that parses the 835 transaction based on format rules documented in "Health Care Claim Payment/Advice 835" provided by the National Electronic Interchange Transaction Set Implementation Guide. For example, payer information is defined by a first set of N1, N2, and N3 segments. The N1 segment 303 identifies a Payer organization name (Empire Blue Cross here). Adjustments by a payer organization made to the amounts originally charged are reported in a Claim Adjustments (CAS) segment 307 identifying a group code CR with an adjustment reason code 29, for example. The CAS segment occurs either at an entire claim level, or at a claim service line level and its documentation is partially shown in FIG. 4. CLP (Claim Payment) segment 305 incorporates a reference to an original submitted claim.

Figure 5:
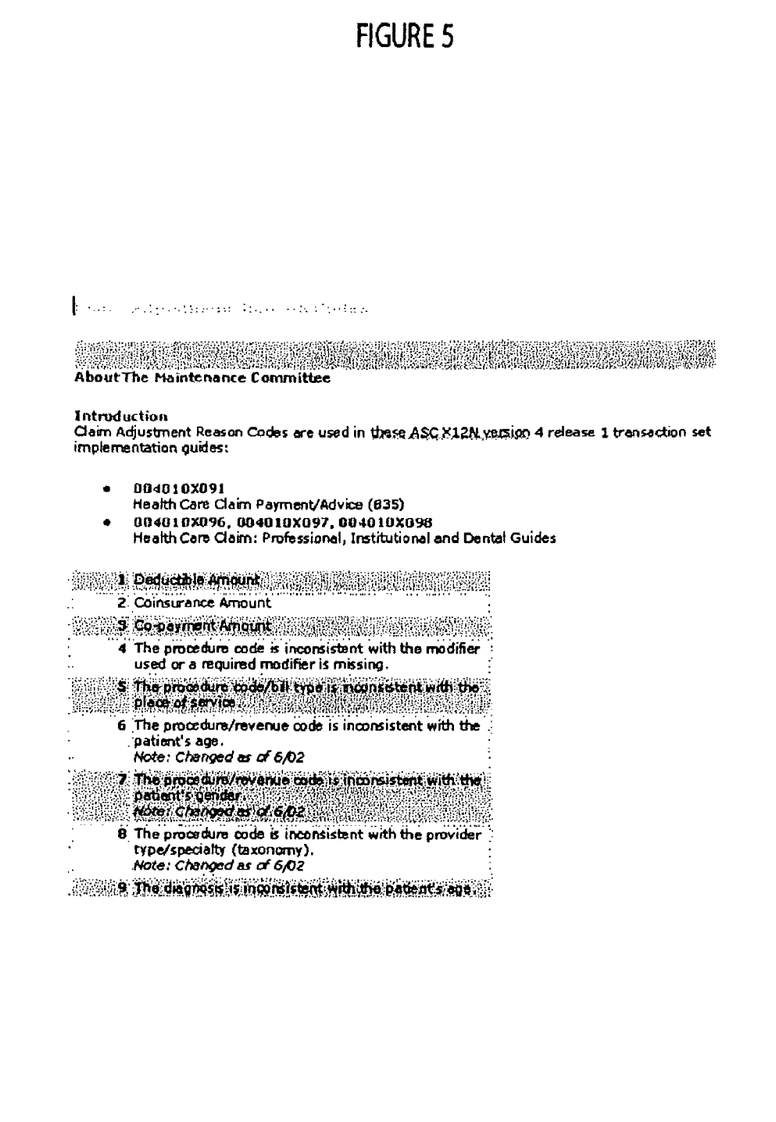
FIGS. 5 and 6 show Payer Claim Adjustment Reason Codes, according to invention principles.
Figure 6:
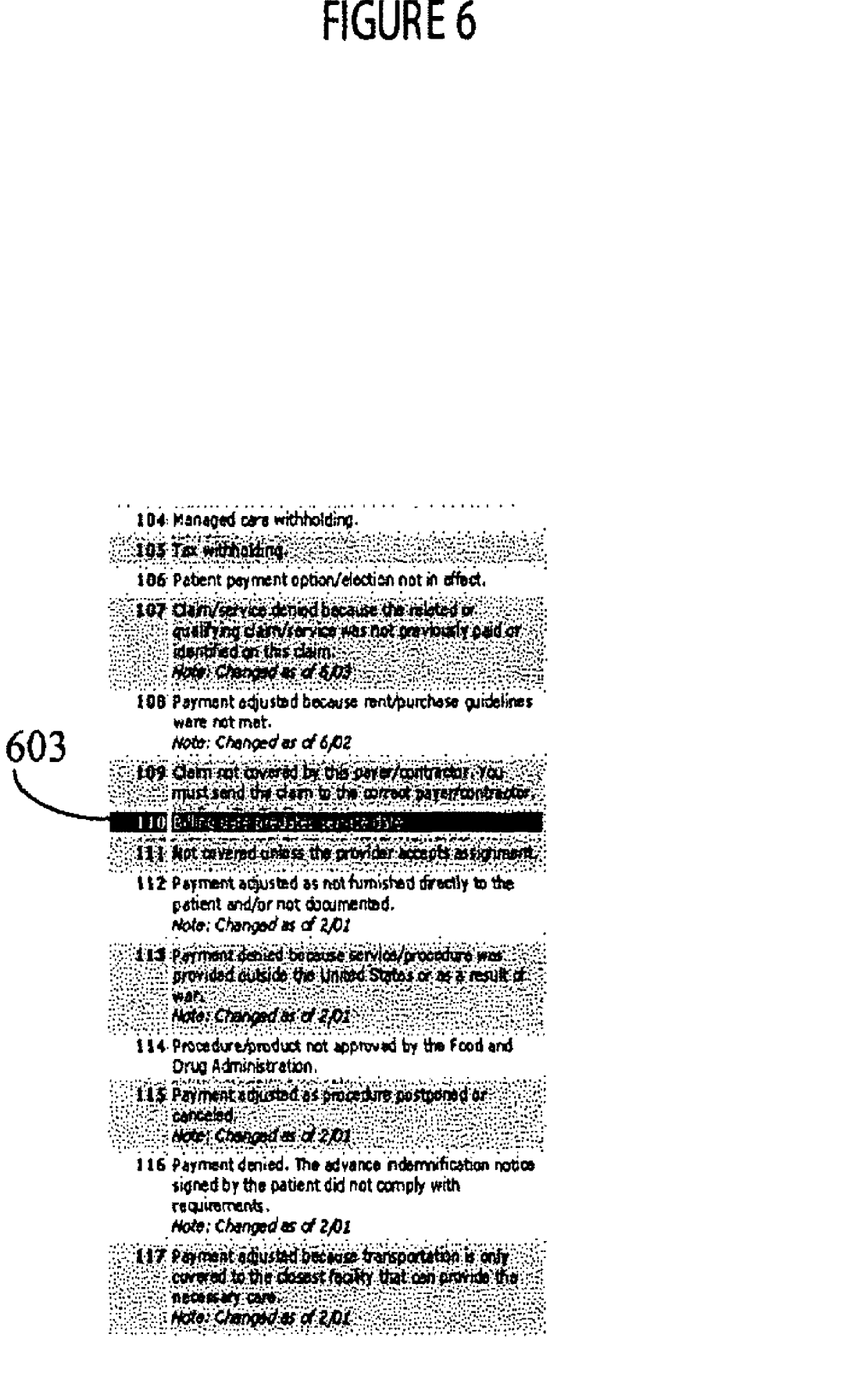

FIG. 4 indicates Claim Adjustment segment (CAS) codes used in claim rejection (adjudication) data analysis. Claim rejections analysis 224 (FIG. 2) parses an RA to identify CAS segments CAS01, CAS02 and CAS03 (items 405, 407 and 409 respectively) and specifically to identify a CAS01 segment to find a CR code (corrections and reversals code) 403. The CAS01 segment comprises a claim Adjustment Group Code which includes a CR corrections and reversals code as well as Contractual Obligations code CO, Other Adjustments code OA, Payer Initiated Reductions code PI and Patient Responsibility code PR. The CAS03 segment indicates a Monetary Amount and specifically a claim Adjustment amount. The CAS02 segment indicates a Claim Adjustment Reason Code. This code explains the reason for the reversal (rejection). There are many reasons for rejections and partial rejections. FIGS. 5 and 6 show Payer Claim Adjustment Reason Codes, in an abbreviated partial list. FIG. 5 shows codes 1-9 indicating deductible amount, coinsurance amount, co-payment amount, procedure code is inconsistent, procedure code/bill type is inconsistent, procedure/revenue code is inconsistent with patient age, procedure/revenue code is inconsistent with patient gender, procedure code is inconsistent with provider type, diagnosis code is inconsistent with age. FIG. 6 shows codes 104-117 indicating managed care withholding, tax withholding, patient payment option not in effect, claim service denied etc.

Figure 7:
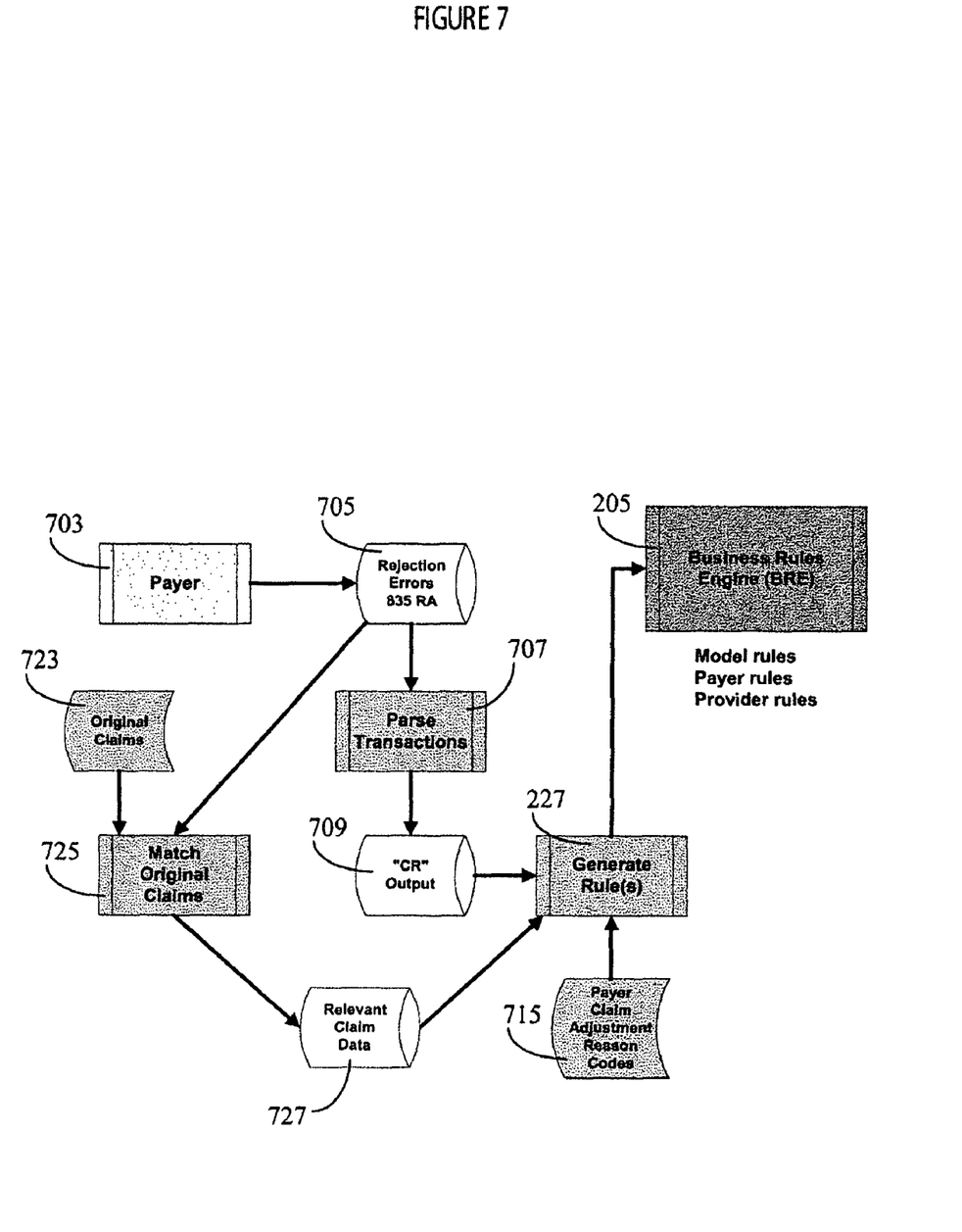
FIG. 7 shows a flowchart of a process for automatic Payer error analysis and rule generation, according to invention principles.

FIG. 7 shows a flowchart of a process for automatic Payer error analysis and rule generation. Payer organization 703 sends claim rejection data in an EDI 835 Remittance Advice (RA) 705 to parser 707 for parsing RA transaction messages. Parser 707 provides output data incorporating necessary information for building one or more rule(s). Specifically, parser 707 outputs data incorporating payer information and a rejection reason as well as a Correction and Reversal CR data 709 derived from RA 705. Further, RA 705 is matched 725 to an original claim 723 via key information in a Claim Payment (CLP) segment derived from RA 705. The matching 725 associates received RA 705 with its corresponding original submitted claim and thereby makes original claim data available for rule generation. Rules generator 227 generates a new rule for incorporation in Business Rules Engine (BRE) 205 based on CR data 709, Payer Claim Adjustment Reason Codes 715 (e.g., as described in connection with FIGS. 4, 5 and 6) and other relevant claim data 727 including data of the original submitted claim. The other relevant claim data 727 is derived using original claim data identified by matching RA 705 with original claim 723. Units 725, 707 and 227 perform error analysis and rule generation.

A rule generated by Rules generator 227 comprises a "condition" followed by an "action" in the form of an "IF . . . THEN . . . " statement. A rule generated for a specific payer organization by Rules generator 227 results in a claim being held from further processing until certain conditions are true. This, for example, is accomplished by setting a global claim variable used by BRE 205 to "H" for "hold". Alternatively, it may be accomplished by producing an error and an associated message for a claim being processed. Rules generator 227 generates the conditional part of a rule (i.e., the IF portion) using a rejection reason code (output from payer error analysis by parser 707) by parsing the rejection reason code and translating key words into variables of a claim data transform object. Other parts of a rejection reason are also translated. For example, a translation of the 110 reason code (item 603 FIG. 6, "Billing date predates service date"), Rules generator 227 translates the 110 reason code by, translating "if", Billing date to "g_claim.billingDate",
translating predates to "<", and
translating service date to "g_claim.serviceDate.

Thereby the translated rule for the 110 reason code comprises, if g_claim.billingDate<g_claim.serviceDate then produceError("Billing date predates service date");

where a claim is a global reference in BRE 205 to the claim.

The output of Rules generator 227 is a group of rules associated with a particular payer organization and this output is automatically loaded into BRE 205 in response to predetermined programmed instruction.

An EDI 835 RA transaction message is received from a payer organization and analyzed by parser 707 (FIG. 7). In an example of operation, a claim is determined by the system to have been rejected by a First Payer Organization for a reason specifically, The diagnosis is inconsistent with the patient's gender. The system matches an original claim with the RA transaction message, extracts diagnosis and gender data, translates the reason code nouns to variables, and translates "is inconsistent with" to "and", and generates the following rule:

```
if (g_claim.diagnosisCode = "V22" and g_claim.gender = "M")
then {
    produceError( " The diagnosis is inconsistent with the
    patient's gender ");
}
```

This rule is placed in BRE 205 in a First Payer Organization rule set. A future claim meeting this same criteria is identified by the system using the rule set and held to be corrected and not sent to a payer organization to be subject to a similar rejection. The system advantageously acquires payer rules by retrospectively analyzing payer rejection errors, and automatically generating rules to cover those rejection situations. Payer rules are automatically acquired by the provider using knowledge mining techniques to evaluate probability of claims payments.

The system translates a rejection reason into a rule that BRE 205 can understand and correctly interpret. Thereby the system acquires payer rules for reimbursement processing and enables cleaning up claims prior to submission to a payer organization. The turnaround time of a claim undergoing review by a payer organization is typically 30 to 45 days so the system achieves substantial savings in time and money in claim processing. Rules generator 227 associates nouns in a rejection reason with claim variables that BRE 205 can understand. BRE 205 references a global claim object (g_claim) with many associated attributes. Adjectives (a patient, a subscriber, a healthcare provider, for example) further identify nouns and are used to qualify variables. Rules generator 227 translates both nouns and such adjectives, exemplified as follows.

| Rejection Reason (\<adjective\>noun) | BRE variable |
|---|---|
| revenue code | g_claim.revenueCode |
| procedure code | g_claim.procedureCode |
| diagnosis | g_claim.diagnosisCode |
| patient's gender | g_claim.patient.gender |
| subscriber's first name | g_claim.suscriber.firstName |
| date of service | g_claim.serviceDate |

Verbs and adverbs in the Rejection Reason are also translated e.g., into logical operators as illustrated below.

| Rejection Reason (verb/adverb) | BRE code |
|---|---|
| is inconsistent with | and |
| predates, precedes | < |
| follows | > |
| not equal | <> |
| is equal | = |

Matching the rejection to the original claim enables look up of the values for variables that were originally sent with the claim. Thus, when a rejection reason mentions patient age, access is made to g_claim.patientAge and the age value is processed by the rule. Further, the action portion of a rule involves holding a claim by issuing a rejection reason as an error message.

Combining translations as indicated above, rejection reasons become rules as follows.

| Rejection Reason | Rule |
|---|---|
| Date of death precedes data of service | if claim.deathDate > claim.serviceDate then produceError ("Date of death precedes date of service") |
| Revenue code is inconsistent with patient age | if claim.revenueCode = "004" and claim.patient.Age = 20 then produceError("Revenue code is inconsistent with patient's Age") |

The system advantageously generates a baseline of rules for individual payer organizations. Further, in a training mode, historical (or test) data is used and communicated to payer organizations, before a provider and payer initiate production processing of claim transactions. The more historical (or test) data that is employed in a training mode prior to production processing of claim transactions, the better and more accurate the payer specific rule sets become.

Figure 8:
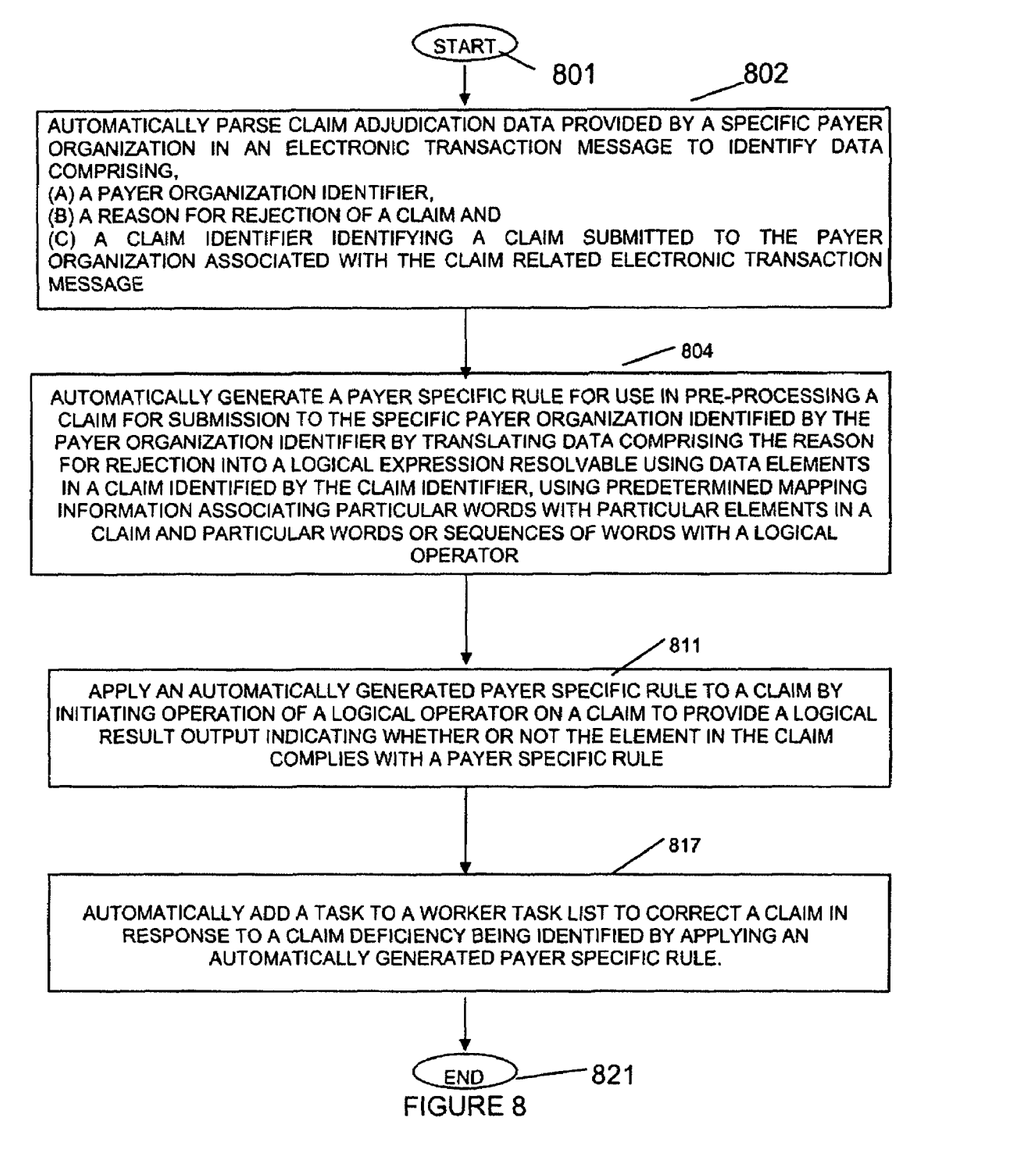
FIG. 8 shows a flowchart of a process used in a system for adapting rules used for processing claim data for reimbursement, according to invention principles.

FIG. 8 shows a flowchart of a process used in system 10 (FIG. 1) for adapting rules used for claim adjudication data provided by a payer organization concerning a claim for reimbursement for provision of healthcare to a patient previously submitted to the payer organization in a claim. In step 802 following the start at step 801, data processor 25 matches claim adjudication data, provided by a specific payer organization in an electronic transaction message, to a claim previously submitted to a payer organization. Data processor 25 also parses claim adjudication data provided by a specific payer organization in an electronic transaction message (an EDI 835 Remittance Advice) to identify data comprising, (a) a payer organization identifier, (b) a reason (and reason code) for rejection of a claim and (c) a claim identifier identifying a claim submitted to the payer organization associated with the claim related electronic transaction message. The rejection of the claim comprises receiving a reimbursement financial sum from a payer organization in response to a submitted claim that is different from the reimbursement financial sum requested in the submitted claim.

In step 804, rules processor 29 automatically generates a payer specific rule for use in pre-processing a claim for submission to the specific payer organization identified by the payer organization identifier. Rules processor 29 does this by interpreting the reason code to derive a reason for rejection of a claim for translation into a logical expression. Rules processor 29 translates data comprising the reason for rejection into a logical expression (a rule) resolvable using data elements in a claim identified by the claim identifier by using predetermined mapping information associating particular words with variables and with particular corresponding elements in a claim and associating particular words or sequences of words with logical operators to generate a resolvable logical expression comprising a logical operator operating on a variable to provide a logical result output. Rules processor 29 automatically generates a resolvable logical expression by translating a verb into a logical operator and by translating a noun or adjective into a variable in response to predetermined mapping instruction. The resolvable logical expression logical operator operates on a variable comprising an element in a claim to provide a logical result output indicating whether or not the element in the claim complies with a payer specific rule. In one embodiment, the resolvable logical expression comprises a condition and an action in the form of an "IF . . . THEN . . . " statement.

Rules repository 17 accumulates data representing automatically generated payer organization specific rules for pre-processing a claim for submission to the specific payer organization. In step 811 pre-processor 15 applies an automatically generated payer specific rule to a claim by initiating operation of a logical operator on a claim to provide a logical result output indicating whether or not the element in the claim complies with a payer specific rule. Pre-processor 15 applies the automatically generated payer specific rule acquired from the rules repository to a claim prior to submission of the claim to the specific payer organization and initiates generation of a message to a user indicating a claim deficiency in response to applying said automatically generated payer specific rule. In step 817, workflow processor 39 automatically adds a task to a worker task list to correct a claim in response to a claim deficiency being identified by applying an automatically generated payer specific rule. In one embodiment, pre-processor 15 initiates auto-correction of the claim in response to a claim deficiency being identified by applying automatically generated payer specific rules. The process of FIG. 8 terminates at step 821.

The systems and processes of FIGS. 1-8 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. System 10 is usable in any field for adapting rules used for processing financial adjudication data provided by a payer organization in response to a submitted transaction related message. The processes and applications may in alternative embodiments, be located on one or more (e.g., distributed) processing devices accessing a network linking the elements of FIG. 1. Further, any of the functions and steps provided in FIGS. 1-8 may be implemented in hardware, software or a combination of both and may reside on one more processing devices located at any location of a network linking the elements of FIG. 1 or another linked network including the Internet.

What is claimed is:

1. A system for adapting rules used for processing claim adjudication data provided by a payer organization concerning a claim for reimbursement for provision of healthcare to a patient previously submitted to said payer organization in a claim, comprising:
   a data processor for parsing claim adjudication data provided by a specific payer organization in an electronic transaction message to identify data comprising,
      (a) a payer organization identifier and
      (b) a reason for rejection of a claim;
   a rules processor for automatically generating a payer specific rule for use in pre-processing a claim for submission to the specific payer organization identified by said payer organization identifier, by automatic analysis of adjudication data of claims previously rejected by a payer and using data of an original claim previously submitted to the specific payer organization and corresponding to the received adjudication data and by translating data comprising said reason for rejection into a logical expression resolvable using data elements in a claim; and
   a rules repository storing data in a non-transitory storage medium for accumulating data representing automatically generated payer organization specific rules; and
   a pre-processor for applying said automatically generated payer specific rules acquired from said rules repository to a claim prior to submission of said claim to said specific payer organization.

2. A system according to claim 1, wherein
said rules processor automatically generates a resolvable logical expression by using predetermined mapping information associating particular words with variables and with particular corresponding elements in a claim and particular words or sequences of words with logical operators in generating a resolvable logical expression comprising a logical operator operating on a variable to provide a logical result output.

3. A system according to claim 2, wherein
said resolvable logical expression logical operator operates on a variable comprising an element in a claim to provide a logical result output indicating whether or not said element in said claim complies with a payer specific rule.

4. A system according to claim 1, wherein
said rules processor automatically generates a resolvable logical expression by translating a verb into a logical operator in response to predetermined mapping instruction.

5. A system according to claim 4, wherein
said rules processor automatically generates a resolvable logical expression by translating a noun or adjective into a variable in response to predetermined mapping instruction.

6. A system according to claim 1, wherein
said rules processor automatically generates a resolvable logical expression comprising a condition and an action.

7. A system according to claim 6, wherein
said resolvable logical expression comprising a condition and an action is in the form of an "IF . . . THEN . . . " statement.

8. A system according to claim 1, wherein
said data processor parses said claim related electronic transaction message to identify a claim identifier identifying said original claim submitted to said payer organization associated with said claim related electronic transaction message and uses said claim identifier to acquire said data of said original claim.

9. A system according to claim 1, wherein
said rejection of said claim comprises receiving a reimbursement financial sum from a payer organization in response to a submitted claim that is different from the reimbursement financial sum requested in said submitted claim.

10. A system according to claim 1, wherein
said data processor parses said claim related electronic transaction message to identify a reason code and
said rules processor interprets said reason code to derive a reason for rejection of a claim for translation into a logical expression.

11. A system according to claim 1, wherein
said pre-processor initiates generation of a message to a user indicating a claim deficiency in response to applying said automatically generated payer specific rules.

12. A system according to claim 1, wherein
said pre-processor initiates auto-correction of said claim in response to a claim deficiency being identified by applying said automatically generated payer specific rules.

13. A system according to claim 1, wherein
said rules processor automatically generates a resolvable logical expression by translating a rejection reason into a rule by translating a verb into a logical operator in response to predetermined mapping instruction.

14. A system for adapting rules used for processing claim adjudication data provided by a payer organization concerning a claim for reimbursement for provision of healthcare to a patient previously submitted to said payer organization in a claim, comprising:
 a data processor for parsing claim adjudication data provided by a specific payer organization in an electronic transaction message to identify data comprising,
  (a) a payer organizaiton identifier,
  (b) a reason for rejection of a claim and
  (c) a claim identifier identifying a claim submitted to said payer organization associated with said claim related electronic transaction message;
 a rules processor for automatically generating a payer specific rule for use in pre-processing a claim for submission to the specific payer organization identified by said payer organization identifier, by automatic analysis of adjudication data of claims previously rejected by a payer and using data of an original claim previously submitted to the specific payer organization and corresponding to the received adjudication data and by translating data comprising said reason for rejection into a logical expression resolvable using data elements in a claim identified by said claim identifier, using predetermined maping information associating particular words with particular elements in a claim and particular words or sequences of words with a logical operator; and
 a pre-processor for applying the automatically generated payer specific rule to a claim prior to submissin of said claim to said specific payer organization by initiating operation of a logical operator on a claim to provide a logical result outpu indicating whether or not said element in said claim complies with a payer specific rule.

15. A system according to claim 14, wherein
said pre-processor initiates generation of a message to a user indicating a claim deficiency in response to applying said automatically generated payer specific rule.

16. A system for adapting rules used for processing claim adjudication data provided by a payer organization concerning a claim for reimbursement for provision of healthcare to a patient previously submitted to said payer organization in claim, comprising:
 a data processor for matching claim adjudication data, provided by a specific payer organization in an electronic transaction message, to a claim previously submitted to a payer organization and parsing said claim adjudication data to identify data comprising,
  (a) a payer organization identifier and
  (b) a reason for rejection of a claim;
 a rules processor for automatically generating a payer specific rule for use in pre-processing a claim for submission to the specific payer organization identified by said payer organization identifier, by automatic analysis of adjudication data of claims previously rejected by a payer and using data of an original claim previously submitted to the specific payer organization and corresponding to the received adjudication data and by translating data comprising said reason for rejection into a logical expression resolvable using data elements in a claim;
 a rules repository for accumulating data representing automatically generated payer organization specific rules for pre-processing a claim for submission to said specific payer organization; and
 a pre-processor for applying the automatically generated payer specific rule to a claim prior to submission of said claim to said specific payer organization.

17. A system according to claim 16, wherein
said rules processor automatically generating a payer specific rule by translating particular words into variables and translating other particular words or sequences of words with logical operators in generating a resolvable logical expression comprising a logical operator operating on a variable to provide a logical result output.

18. A system according to claim 16, including
a workflow processor for automatically adding a task to a worker task list to correct a claim in response to a claim deficiency being identified by applying the automatically generated payer specific rule.

19. A system according to claim 16, wherein
said claim adjudication data provided in said electronic transaction message comprises a Remittance Advice compatible with an Electronic Data Interchange (EDI) standard 835 transaction format.

\* \* \* \* \*